US006805231B2

(12) United States Patent
Kunimune et al.

(10) Patent No.: US 6,805,231 B2
(45) Date of Patent: Oct. 19, 2004

(54) SUSHI SERVING SYSTEM CONTAINING A PREMIUM MESSAGE

(76) Inventors: Tetsunori Kunimune, 818 N. Lake St., Burbank, CA (US) 91502; Masateru Kunimune, 818 N. Lake St., Burbank, CA (US) 91502

( * ) Notice: Subject to any disclaimer, the term of this patent is extended or adjusted under 35 U.S.C. 154(b) by 56 days.

(21) Appl. No.: 10/300,374

(22) Filed: Nov. 21, 2002

(65) Prior Publication Data

US 2004/0099506 A1 May 27, 2004

(51) Int. Cl.[7] ................................................ B65G 43/00
(52) U.S. Cl. ......................... 198/502.1; 186/49; 40/524
(58) Field of Search ......................... 198/502.1; 186/49, 186/38; 104/73, 59; 40/524

(56) References Cited

U.S. PATENT DOCUMENTS 4,429,867 A * 2/1984 Barber ........................ 104/73
4,560,032 A * 12/1985 Imanaka ...................... 186/38
5,566,782 A * 10/1996 Iwamoto et al. .............. 186/49
6,082,525 A * 7/2000 Vonholm et al. ......... 198/502.1
6,179,088 B1 * 1/2001 Lai ............................ 186/49
6,186,314 B1 * 2/2001 Conklin, Jr. ............. 198/502.1
6,251,450 B1 * 6/2001 Giacoman ................... 426/106
6,431,318 B1 * 8/2002 Tanaka ........................ 186/49
6,434,970 B1 * 8/2002 Hasegawa .................. 62/457.6

* cited by examiner

*Primary Examiner*—James R. Bidwell
(74) *Attorney, Agent, or Firm*—Eugene Oak

(57) ABSTRACT

A novel sushi serving system contains a premium message for serving sushi. A utensil for serving sushi has a message marble, hidden between a sushi and the utensil, thereupon a "premium" message, such as "10 slices of free sushi" mounted. The utensil for serving sushi is manipulated in a shape of, including but not limited to, a plain dish, a boat, a car and a fish. The message marble is located in a pocket on the utensil. Patrons can find the message marble after they finish the sushi served thereon. Patron who finds a message marble submits the marble to the cashier and gets the premium prizes. The sizes of the pocket on the utensil are slightly larger than those of the message marble. The shape of the pocket is the same as that of the message marble. The shape of the message marble is, including but not limited to, an animal, a plant, a star, a geometrical drawing, a sushi, furniture and a landscape. The consisting material of the message marble is, including but not limited, a ceramic, a wood, a paper, a leaf of palnt and a rigid plastic. The size of the message on the marble is not larger than the size of the sushi thereon. The size of the message marble is larger than the sushi but smaller than the dish.

2 Claims, 3 Drawing Sheets

SUSHI SERVING SYSTEM CONTAINING A PREMIUM MESSAGE

BACKGROUND OF THE INVENTION

1. Field of the Invention

The present invention relates to a utensil for providing a sushi with a premium message thereon.

2. Description of the Prior Art

U.S. Pat. No. 6,251,450 to Giacoman illustrates a food packaging with a removable prize therein. Prizes are located between a first surface of a first sheet of plastic and a first surface of a second sheet of plastic via adhesive. Food is placed on a second, opposite surface of the first plastic sheet and the first surface of the second sheet. U.S. Pat. No. 5,282,534 to Lapp illustrates a combined consumer product and a discount coupon delivery package having a shallow recess for containing a pack of coupons. The recess is covered by a label cover, which has an integral access panel to expose the coupons and permit the extraction thereof. U.S. Pat. No. 5,035,515 to Crossman, et al. discloses a packaging comprised of a pocket, an enclosure for holding merchandise, having one sealed edge. A seal along one edge of the extensions closes the compartment. The detachable compartment carries a promotional message. A perforation line extends parallel to the one sealed edge of the pocket to make the compartment detachable from the pocket by a consumer. The pocket remains functional when the compartment is detached.

U.S. Pat. No. 6,431,318 to Tanaka, U.S. Pat. No. 6,179,088 to Lai, U.S. Pat. No. 5,566,782 to Iwamoto, et al., U.S. Pat. No. 4,560,032 to Imanaka, and U.S. Pat. No. 4,429,867 to Barber illustrate a food and drink serving system, especially sushi. The conveying system is interlinked via watercourses, allowing travel of sushi boats from one place to another. Patrons sit around a periphery of the watercourse select and pick up various types of food. The food carriers are structurally independent from one another so that each food carrier is independently removable from the watercourse. U.S. Pat. No. 4,190,134 to Kato illustrates a dish carrying system. Rails are laid out between a kitchen or food preparation area and a dining area in a restaurant and a number of tables are arranged along and on opposite sides of the rails. At least one vehicle carries food. A model locomotive running on the tails pulls the vehicle to convey food prepared in the kitchen or food preparation area to a specific one or ones of the dining tables.

However, none of the prior art teaches a method of providing sushi with premium message as shown in this invention.

SUMMARY OF THE INVENTION

It is the purpose of this invention to provide a novel method of serving a prize by a utensil while serving sushi. The utensil for sushi has a message marble, hidden between a sushi and the utensil, thereupon a “premium” message, such as “10 dishes of free sushi” is mounted. The utensil for the sushi is manufactured in a shape of, including but not limited to, a plain dish, a boat, a car and a fish. The message marble is located in a pocket on the utensil. Patrons can find the message marble after they finish the sushi served thereon. A patron who finds a message marble submits the marble to the cashier and gets the premium prizes. The sizes of the pocket on the utensil are slightly larger than that of the message marble. The shape of the pocket is the same as that of the message marble. The shape of the message marble is, including but not limited to, an animal, a plant, a star, a geometrical drawing, a sushi, furniture and a landscape. The consisting material of the message marble is, including but not limited, a ceramic, a wood, a paper, a leaf of plant and a rigid plastic. The size of the message on the marble is not larger than the size of the sushi thereon. The size of the message marble may be larger than the sushi.

DETAILED DESCRIPTION OF THE PREFERRED EMBODIMENT

Figure 1:
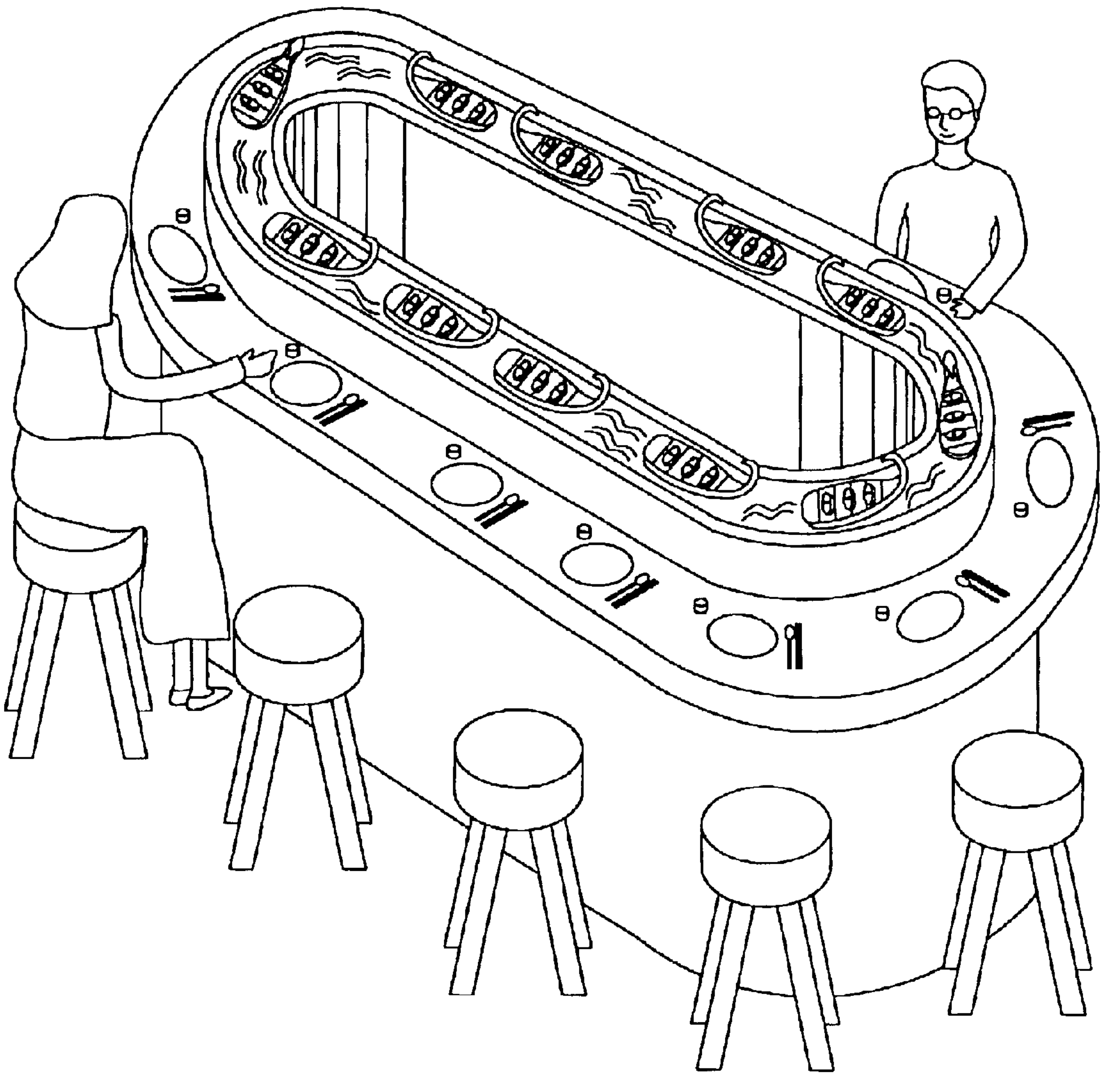
FIG. 1 is a conventional sushi serving system and utensil of the prior art.

FIG. 1 is a conventional sushi serving system and utensil of the prior art. Some of the floating boats on a water loop have been known to Japanese sushi bar. The kind of serving a food or drink with a floating boat on a water loop has been known to public over 1,000 years from the “Shilla” dynasty of KOREA. The water loop, named PO SEOK JUNG, is located outskirts of a palace in the city of “Kyoung Ju”, the old capital of Shilla dynasty. Description of the use of the water loop appears on the guide plate boards. Millions of people from all over the world come to Korea and see the floating boat serving system every year. More popular serving system in these days is that of utilizing a flat conveyer. A boat shaped utensil or just a plane dish is used for carrying sushi thereon.

Figure 2:
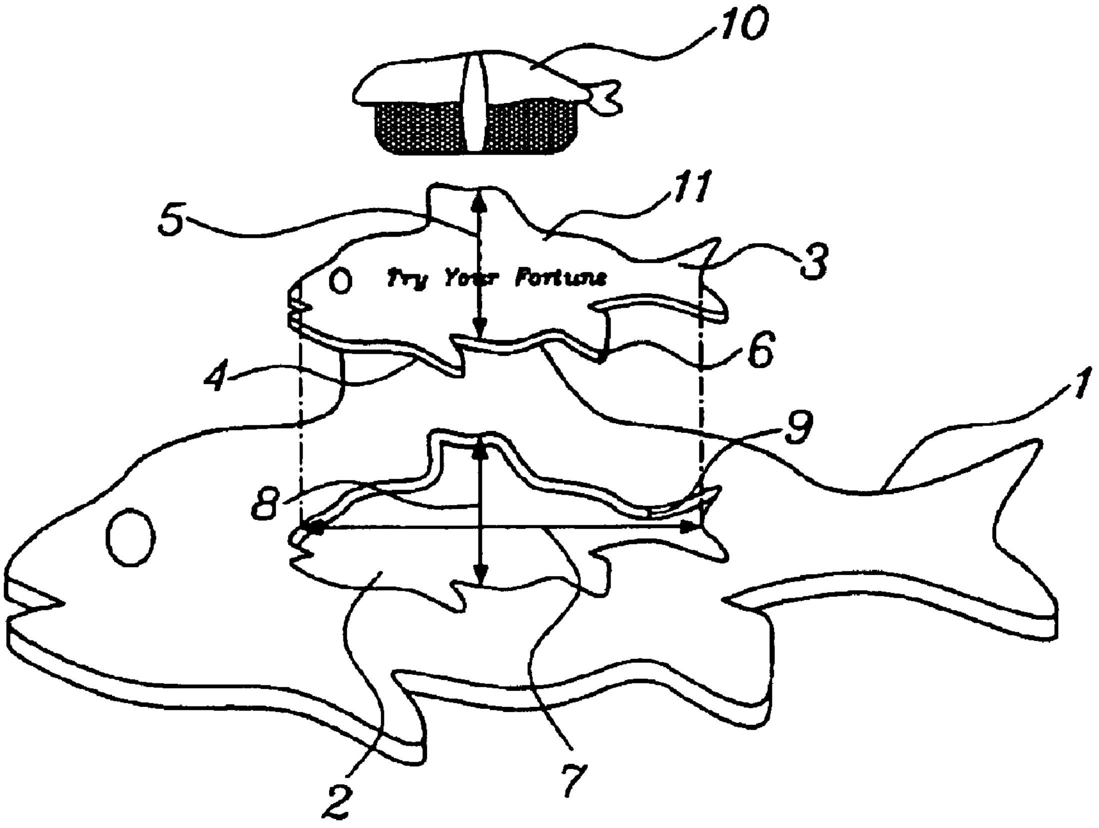
FIG. 2 is an exploded view of the utensil for sushi of this invention.

FIG. 2 is an exploded view of a utensil (1) for sushi of this invention. Whatever the shape is, the utensil for serving sushi, of the prior art does not have a pocket to hide a message marble. The utensil (1) of this invention has a pocket (2) to hide a message marble (3) therein. The size of the message marble (3) is slightly smaller than the pocket (2). There is 0.2 mm clearance between the marble and the pocket along the entire perimeter. The horizontal length (4) of the marble (3) is in the range of 2.9 to 9.9 cm and the vertical length (5) of the marble (3) is in the range of 0.4 to 4.9 cm. The depth (6) of the marble (3) is in the range of 0.1 to 0.3 cm. The horizontal length (7) of the pocket (2) is in the range of 3 to 10 cm and the vertical length (8) of the pocket is in the range of 0.5 to 5 cm. The depth (9) of the pocket (2) is identical to the marble (3), in the range of 0.01 mm to 3 cm.

Figure 3:
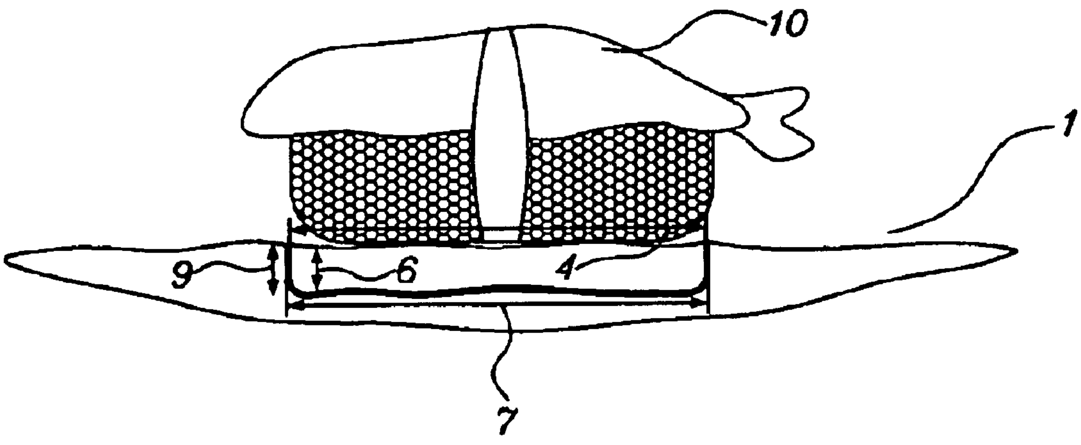
FIG. 3 is a cross sectional view of the utensil for sushi of this invention.
Figure 4:
FIG. 4 is a bottom view of the message marble of this invention.

When a patron picks up the utensil (1) containing sushi (10) thereon, the patron does not know that a message marble (3) is underneath the sushi (10). But if the patron picks up the sushi (10) to eat, he or she finds the marble (3) on the utensil (1). There is a message (11) such as ‘Please turn over.’ as shown in FIG. 3. If the patron turns over the marble (3) he or she can find the prize message such as ‘Another 2 free dishes of sushi.’ as shown in FIG. 4. Or ‘Try next time.’ The message marble (3) is made of, including but not limited, a ceramic, a wood, a paper and a rigid plastic, which does not contain toxic material. The utensil (2) is made of, including but not limited, a ceramic, a wood, a paper and a rigid plastic, which does not contain toxic material. The shape of the utensil (2) is, including but not limited to, a boat, a car, a plane, an animal and a heavenly body. The shape of the marble (3) is, including but not limited to, a boat, a car, a plane, an animal and a heavenly body.

The best mode of this invention is to make the marble (3) with paper and the utensil (2) with ceramic.

What is claimed is:

1. A sushi serving utensil comprised of a fish shape dish having a fish shape pocket of 1.0 mm thickness, and a message marble, which has the same shape and the same thickness with those of the pocket and has a premium message on the under side thereof, facing the bottom of the pocket.

2. A sushi serving utensil of claim 1, wherein there is 0.2 mm clearance between the marble and the pocket along the entire perimeter.

* * * * *